United States Patent
Lee et al.

(10) Patent No.: US 10,521,327 B2
(45) Date of Patent: Dec. 31, 2019

(54) NON-COUPLED SOFTWARE LOCKSTEP

(71) Applicant: 2236008 Ontario Inc., Waterloo (CA)

(72) Inventors: Patrick Christopher Lee, Kanata (CA); Mohamed Al Shamouby, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 156 days.

(21) Appl. No.: 15/693,814

(22) Filed: Sep. 1, 2017

(65) Prior Publication Data
US 2018/0089059 A1    Mar. 29, 2018

Related U.S. Application Data

(60) Provisional application No. 62/401,764, filed on Sep. 29, 2016.

(51) Int. Cl.
*G06F 11/00* (2006.01)
*G06F 11/36* (2006.01)
*G06F 11/16* (2006.01)

(52) U.S. Cl.
CPC ........ *G06F 11/3612* (2013.01); *G06F 11/16* (2013.01)

(58) Field of Classification Search
CPC ............ G06F 11/1629; G06F 11/1608; G06F 11/3612; G06F 11/16; G06F 11/1482; G06F 11/1494; G06F 11/1497; G06F 11/1487; G06F 11/1492
See application file for complete search history.

(56) References Cited

U.S. PATENT DOCUMENTS

| | | | |
|---|---|---|---|
| 5,896,523 A | 4/1999 | Bissett et al. | |
| 7,877,642 B2* | 1/2011 | Ding | G06F 11/3636 714/45 |
| 8,656,217 B2* | 2/2014 | Niesser | G06F 11/1629 714/11 |
| 9,213,654 B1* | 12/2015 | Havemose | G06F 11/1482 |
| 9,262,203 B2* | 2/2016 | Bacher | G06F 9/46 |
| 9,507,690 B2* | 11/2016 | Mangold | G06F 11/3612 |
| 2005/0240806 A1 | 10/2005 | Bruckert et al. | |
| 2008/0244354 A1* | 10/2008 | Wu | G06F 11/1407 714/755 |
| 2009/0183035 A1 | 7/2009 | Butler et al. | |
| 2013/0125137 A1 | 5/2013 | Diekema et al. | |
| 2014/0368513 A1 | 12/2014 | Lyashevsky et al. | |

OTHER PUBLICATIONS

International Search Report, issued in International Application No. PCT/CA2017/051140, dated Dec. 12, 2017, pp. 1-7, Canadian Intellectual Property Office, Gatineau, Quebec, Canada.
Leslie Lamport, "Time, Clocks, and the Ordering of Events in a Distributed System," Communications of the ACM, dated Jul. 1978, pp. 558-565, vol. 21 No. 7, ACM, Rochester, NY.

* cited by examiner

*Primary Examiner* — Marc Duncan
(74) *Attorney, Agent, or Firm* — Rowand LLP

(57) ABSTRACT

Systems and methods of detecting a difference in behavior of processes are provided. Differences may be detected by comparing operating system programmatic procedure invocations made by the processes.

21 Claims, 6 Drawing Sheets

NON-COUPLED SOFTWARE LOCKSTEP

CROSS-REFERENCE TO RELATED APPLICATIONS

This application is a non-provisional application of, and claims priority under 35 USC § 119(e) to, U.S. Provisional Application 62/401,764, "NON-COUPLED SOFTWARE LOCKSTEP" filed Sep. 29, 2016, the entire contents of which are incorporated by reference.

BACKGROUND

1. Technical Field

This application relates to lockstep systems, and in particular, to software based lockstep systems.

2. Related Art

Lockstep systems may be fault-tolerant computer systems that run a same set of operations on two different hardware systems at the same time in parallel. Present approaches to lockstep systems suffer from a variety of drawbacks, limitations, and disadvantages.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
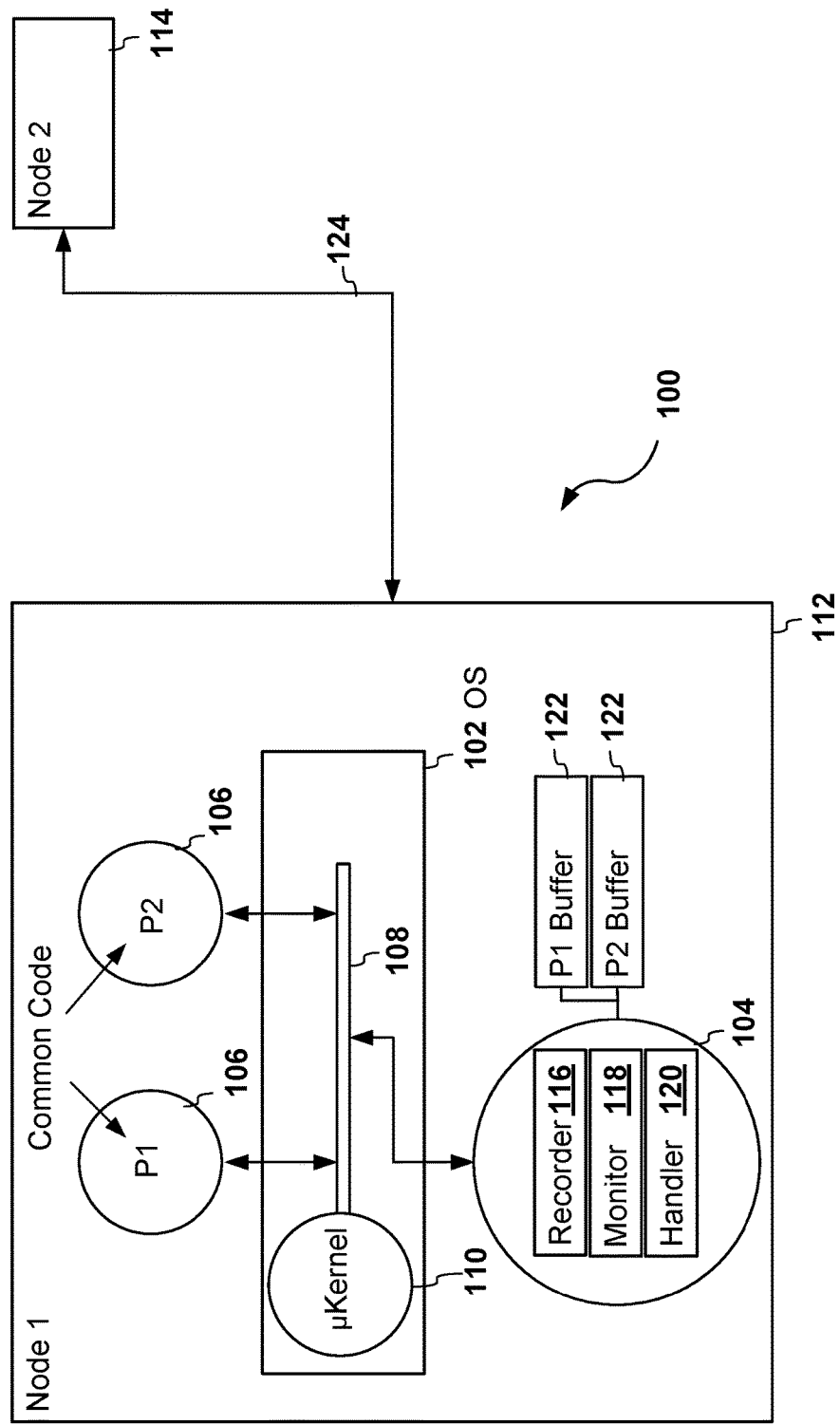
FIG. 1 illustrates an example of a non-coupled software lockstep system configured to detect differences between outputs of processes.

Systems and methods of detecting a difference in behavior of processes operating in lockstep are provided. Differences may be detected by comparing operating system programmatic procedure invocations made by the processes.

For example, two or more copies of the same software may execute on different cores of a multiprocessor and the operating system calls made by each copy of the software may be compared to confirm each copy of the software behaves the same as the other copy or copies. Such systems and methods may be applied, for example, in a safety system where essentially non-detectable, non-deterministic hardware errors may occur (in other words, an error may occur in any processor and be a non-deterministic hardware error that may be difficult to detect without the systems or methods described herein).

In the non-coupled software lockstep system, the system may check whether two identical applications are running in substantially the same way. Such a redundancy based system may detect faults (potentially even transitory faults) in hardware that may otherwise go unnoticed, but yet lead to unintended results. For example, a bit flip caused by a single event upset may lead to an incorrect result. (A single event upset is a change of state caused by one single ionizing particle striking a sensitive node in a micro-electronic device, such as in a microprocessor, a semiconductor memory, or a power transistor.) If only one copy of the application is executing, then the incorrect result may not be found or noticed. However, if two identical copies are executed and the outputs are different, the incorrect result may be noticed or detected.

The copies of the application may execute on a single computing device. Alternatively, each copy of the application may execute on a different computing device. If the copies of the application execute on the single computing device, processor affinity or core affinity may cause each copy of the application to execute using a different hardware than the other copy or copies. Processor affinity enables the binding and unbinding of a process or a thread to a central processing unit (CPU) or a range of CPUs, so that the process or thread will execute only on the designated CPU or CPUs rather than on any CPU. Techniques such Lamport's logical clocks may be used to ensure that the copies of the applications receive common inputs when reading from resources, such as hard drives and network resources.

Although traditional lockstep systems may only execute one set of operations on two different hardware systems, here both copies of the application may be run on common hardware, such as a single processor and/or a single core, in some examples. In such examples, the execution of the copies of the application may be separated by time instead of hardware. Also in such examples, the system may detect "soft" or transient errors but not likely "hard" or permanent errors.

If the operating system is a message-based operating system, simple calls to the operating system often cause messages to be moved between threads, processes, a microkernel and drivers. All or most requests to the microkernel are messages. In some examples of the message-based operating system, all or most data exchanges between processes are triggered by messages, and all or most events are messages. The term "most" means a majority or greater than 50 percent. Messages are commonly generated when invoking programmatic procedures of the message-based operating system even though the application invoking the programmatic procedure may be unaware of the messages.

In the non-coupled software lockstep system, a difference detector may execute on the same processor as the copies of the application. Alternatively, the difference detector may execute on a different processor than the copies of the application. The difference detector may observe the sequence of messages and the contents of those messages and ensure that message sequences and message contents are identical or nearly identical for each of the copies of the application. In the non-coupled software lockstep system, identical copies of the application may run independently of each other without synchronization points between the copies of the application. In other words, the application may not need to be programmed to identify any synchronization point or compare results at a synchronization point. If the message sequence varies between the two identical application copies or the contents of the messages vary between the two identical application copies, the difference detector may determine that the identical copies of the application are not acting or behaving identically and that likely an error has occurred. The difference detector may report the error (or difference) to a supervising application. The code in the copies of the application may not have to identify a location in the code where outputs of the copies of the application may be compared. In other words, the application does not have to be modified or be originally written to address synchronization points. Instead, the application may be unaware that any operating system call will be compared with an operating system call made by a second instance of the application.

The non-coupled software lockstep system may enable, in some examples, the copies of the application to execute on normal multi-core commercial processors running at normal speeds. In other words, no specialized hardware may be needed, and the copies of the application may execute in a production environment as well as in a test environment.

FIG. 1 illustrates an example of a non-coupled software lockstep system 100 configured to detect differences between outputs of processes 106 (designated P1 and P2 in FIG. 1). The process designated P1 may execute the same code as the process designated P2. The system 100 may detect any difference between the outputs of the processes 106 by comparing calls (programmatic procedure invocations) made by the processes 106 to a message-based operating system (OS) 102.

The system 100 may include a difference detector 104 that executes within the OS 102, or alternatively, as shown in FIG. 1, as a process that executes outside of the OS 102. The OS 102 depicted in FIG. 1 is a message-based operating system. The message-based operating system handles invocations of operating system calls by processing corresponding messages from the processes 106. Incidentally, the OS 102 may also handle invocations of operating systems calls made by the difference detector 104. The OS 102 may also handle interprocess communication through a similar mechanism, passing messages between processes over a software bus or a channel 108. The OS 102 may include, in some examples, a microkernel 110 comprising a message layer (not shown) that implements the message passing functionality of the OS 102.

In addition to interprocess communication, the OS 102 may handle internode communication in some implementations. For example, the OS 102, the processes 106, and the difference detector 104 may be included on a first node 112, while a second node 114 may include an operating system and one or more processes. Any of the one or more processes 106 on the first node 112 may communicate with a target process on the second node 114 by passing a message to the OS 102 of the first node 112, which delivers the message over a communication channel 124 to the target process on the second node 114.

The nodes 112, 114 may be on the same device or, alternatively, on separate physical devices that are in communication over a network. Each node may be an instance of a server, an instance of a virtual machine, a container, a computing device, or any other device on a network, where the device may be real or virtual. Each node may be included in an endpoint. Examples of endpoints include, without limitation, any of the following: mobile devices (e.g., smartphones, tablets, laptops, wearables, gaming devices, navigation devices, cameras, etc.), computers (e.g., laptops, desktops, etc.), IoT (Internet of Things) devices (e.g., vehicles, appliances, smart devices, connected devices, buildings including homes, etc.), EoT (Enterprise of Things) devices (i.e., IoT devices in an enterprise) and any other nodes or combination thereof. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

The difference detector 104 may include a recorder 116, a monitor 118, and a handler 120. The difference detector 104 may receive process invocation information from the OS 102. The process invocation information received from the OS 102 may identify the programmatic procedures invoked by the processes 106.

The recorder 116 may build a buffer (designated "P1 Buffer" in FIG. 1) that identifies the programmatic procedure invocations made by the process P1 to the OS 102. The monitor 118 may compare the programmatic procedure invocations made by the process P1 to the programmatic procedures invocations made by the process P2 to the OS 102. For example, the monitor 118 may determine if the programmatic procedure invocations made by the process P1 deviate from the programmatic procedure invocations made by the process P2. The handler 120 may react to any detected difference. For example, the handler 120 may notify a supervisory application (not shown) or otherwise take action in response to the detection of a difference.

More generally, the recorder 116 may build a buffer 122 that identifies sequences of invocations of operating system programmatic procedures that the process 106 makes. For example, FIG. 1 illustrates two buffers 122, designated P1 Buffer and P2 Buffer, respectively; one buffer for each of the two processes 106 illustrated (P1 and P2). In the primary example described below, the recorder 116 generates just the P1 buffer and the P2 buffer is not generated. However, in other examples, the recorder 116 generates buffers for two or more of the processes 106, including, for example, the P1 buffer and the P2 buffer.

Short sequences of system calls are a good discriminator between normal and abnormal behavior of a process. A collection of the short sequences of system calls made by a process may be a relatively stable signature of behavior of the process.

For a non-trivial software program executing in a process, the complete set of programmatic procedure invocations may be enormous. However, a local (compact) ordering of the invocations may be remarkably consistent over longer periods of operation of the process. An example is provided below to illustrate the operation of the recorder 116.

For example, one of the processes 106, such as the process P1, may invoke the following operating system programmatic procedures in the following order: open( ), read( ), mmap( ), mmap( ), open( ), getrlimit( ), mmap( ), and close( ). A window size L may be selected, where the window size L indicates the number of sequential invocations to include in the window. The number of invocations k to follow the first invocation in the window (in other words, k is a lookahead size). The window size L equals the lookahead size k+1. Table 1 below illustrates a set of sequential invocations formed with a window size of four (k=3) as the window slides across the following example sequence of invocations: open( ), read( ), mmap( ), mmap( ), open( ), getrlimit( ), mmap( ), and close( ).

TABLE 1

| Call | Previous Call | Second Prev. Call | Third Prev. Call |
|---|---|---|---|
| open | N/A | N/A | N/A |
| read | open | N/A | N/A |

TABLE 1-continued

| Call | Previous Call | Second Prev. Call | Third Prev. Call |
|---|---|---|---|
| mmap | read | open | N/A |
| mmap | mmap | read | open |
| open | mmap | mmap | read |
| getrlimit | open | mmap | mmap |
| mmap | getrlimit | open | mmap |
| close | mmap | getrlimit | open |

Table 2 illustrates the calls (invocations) from Table 1 ordered by the first call in the window, and compacted. When compacted, the invocations in a respective position (such as Previous Call, Second Previous Call, or Third Previous Call) are consolidated as being acceptable for that respective position. For example, the following call sequence (ordered from the most recent to the oldest invocation), would be considered found in Table 2 even though the same sequence is not listed in Table 1: mmap( ), read( ), read( ), open( ). The reason is that read( ) is considered acceptable at the Second Previous Call position for the mmap( ) call.

TABLE 2

| Call | Previous Call | Second Prev. Call | Third Prev. Call |
|---|---|---|---|
| open | mmap | mmap | read |
| read | open | N/A | N/A |
| mmap | read | open | open |
|  | mmap | read | mmap |
|  | getrlimit | open |  |
| getrlimit | open | mmap | mmap |
| close | mmap | getrlimit | open |

An anomaly or difference in the call sequence made by the process P1 compared to the call sequence made by the process P2 may be detected by sliding a same sized window over the sequential invocations of the operating system programmatic procedures that are made by the process P2 while the process P2 is being monitored. For example, the process P2 may invoke the following operating system programmatic procedures in the following order while being monitored: open, read, mmap, open, open, getrlimit, mmap, close. Table 3 below illustrates deviations from Table 2 when comparing with a set of sequential invocations formed as a window slides across the sequence of invocations made by the process P2 while the process P2 is monitored. The deviations are shown with capitalization. In other words, "open" is ultimately preceded by "read" instead of "mmap" on the second previous call at line 1; "open" is ultimately preceded by "open" instead of "read" on the third previous call at line 1; "open" is preceded by "open" instead of "mmap" on the previous call at line 1; and "getrlimit" is ultimately preceded by "open" instead of "mmap" at the second next call on line 3.

TABLE 3

| Call | Previous Call | Second Prev. Call | Third Prev. Call |
|---|---|---|---|
| open | MMAP | MMAP | READ |
| read | open | N/A | N/A |
| mmap | read | open | N/A |
|  | mmap | read | open |
|  | getrlimit | open | mmap |
| getrlimit | open | MMAP | mmap |
| close | mmap | getrlimit | open |

Figure 2:
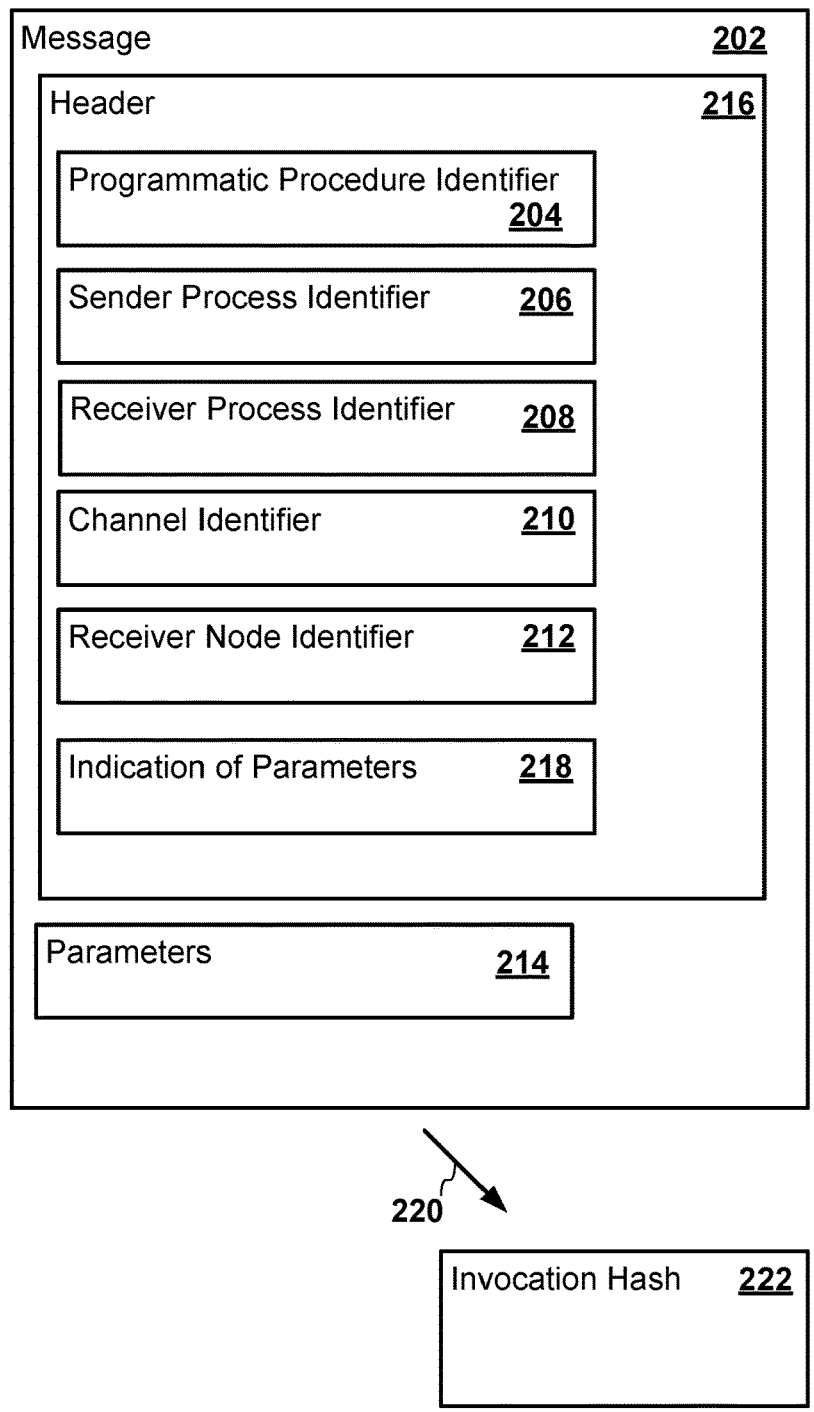
FIG. 2 illustrates an example message.

In the message-based OS 102, most—if not all—of the operating system programmatic procedure invocations are made through corresponding messages sent through the operating system 102. Each of the messages may have a format similar to a message 202 shown in FIG. 2.

The message 202 may include a programmatic procedure identifier 204, a sender process identifier 206, a receiver process identifier 208, a channel identifier 210, a receiver node identifier 212, one or more parameters 214 passed to the programmatic procedure or any combination thereof. The message 202 may include additional, fewer, or different components. For example, the message 202 may include a header 216 that includes the programmatic procedure identifier 204, the sender process identifier 206, the receiver process identifier 208, the channel identifier 210, and the receiver node identifier 212. In some examples, the header 216 may include an indication 218 of the parameters 214 passed to the programmatic procedure. For example, the indication 218 of the parameters 214 may be a fixed size value that includes the first N bytes of any of the parameters 214. If no parameters are passed or less than N bytes of parameters are passed as parameter(s), then the indication 218 of the parameter 214 may include a place holder, such as zero, in any unused portion of the fixed size value.

The programmatic procedure identifier 204 may be any identifier of the programmatic procedure that was invoked. The programmatic procedure identifier 204 may be a text name of the programmatic procedure, a numeric value identifying the programmatic procedure, or any other value that identifies the programmatic procedure. For example, programmatic procedure identifiers may be unique numbers that the OS 102 assigned to the programmatic procedures of the OS 102.

The sender process identifier 206 may be any identifier that identifies the process 106 that invoked the programmatic procedure identified in the message 202. Similarly, the receiver process identifier 208 may be any identifier that identifies the process 106 that is to receive the message 202. For example, the receiver process identifier 208 may identify a process executing within the OS 102, any of the processes 106 executing on the OS 102 or any process on another node. The OS 102 may assign static process identifiers 206, 208 so that the process identifiers 206, 208 remain the same even after a reboot of the nodes 112, 114. For example, the OS 102 may assign a unique number or name to a program executable. For example, the "dir" executable, which provides a listing of files on some operating systems, may be assigned the name "dir". Multiple instantiations of a program executable may, in some examples, have additional information added to the process identifier 206, 208. For example, the second instance of the "dir" executable may be assigned "dir-2" as the sender process identifier 206.

The channel identifier 210 may be any identifier that identifies the communication channel 108, 124 between the processes 106 or between a process and the OS 102. For example, for each communication channel 108, 124 that a process creates, the OS 102 may assign a sequentially higher number. As an illustrative example, a first channel created by the process may be assigned the channel identifier "1", the second channel created by the process may be assigned the channel identifier "2", and so on.

The receiver node identifier 212 may be any identifier that identifies the node that is to receive the message 202. Examples of the node identifier 212 may include a static network address, a media access control address (MAC address), an Ethernet address, a wireless hardware address, a static Internet Protocol (IP) address, and any other such identifier.

The parameters 214 may include a definition of the parameters, such as a data type of each parameter arranged in the order the parameters are passed to the programmatic procedure. The definition of the parameters may be useful in some examples to distinguish between programmatic procedures that are overloaded (multiple programmatic procedures have the same name, but different parameters). Alternatively or in addition, the parameters 214 may include one or more actual values passed as input to the programmatic procedure. Alternatively or in addition, the parameters 214 may include a reference to a value, which is sometimes referred to as "pass by reference" as opposed to "pass by value".

The difference detector 104 may generate (220) an invocation hash 222 based on the message 202 or, more generally, based on information identifying the invocation of the programmatic procedure. The invocation hash 222 may be a non-cryptic hash of all or any portion of the message 202. Alternatively, the invocation hash 222 may be a cryptic hash of all or any portion of the message 202. The difference detector 104 may generate the invocation hash 222 using any suitable hash function. A hash function may be any function that maps data of arbitrary size to data of fixed size. If the difference detector 104 is configured to monitor the processes 106 in real-time, then the hash function chosen may be one that completes relatively quickly. The invocation hash 222 may be 32 bits, 64 bits, or any other size.

In one example, the invocation hash 222 may be a hash of the programmatic procedure identifier 204 and the receiver process identifier 208. Alternatively, the invocation hash 222 may be a hash of the programmatic procedure identifier 204, the sender process identifier 206, and the receiver process identifier 208. Alternatively, the invocation hash 222 may be a hash of the programmatic procedure identifier 204, the sender process identifier 206, the receiver process identifier 208, the channel identifier 210, the receiver node identifier 212, the indication 218 of the parameters 214 passed to the programmatic procedure, or any combination thereof. In other words, the invocation hash 222 may be a hash of the message 202 or any combination of the components of the message 202. The sender process identifier 206 may be excluded from the invocation hash 222 in examples where P1 and P2 execute on the same node. If the invocation hash 222 is based at least in part on the indication 218 of the parameters 214, any "pass by reference" indication may be excluded from the invocation hash 222.

The invocation hash 222 is an innovative structure that identifies a programmatic procedure invocation. The more components of the message 202 passed to the hash function, the more narrowly the programmatic procedure invocation is identified. For example, passing the receiver node identifier 212 to the hash function will cause the invocation hash 222 to distinguish between invocations to multiple nodes even if the invocations are otherwise identical.

Figure 3:
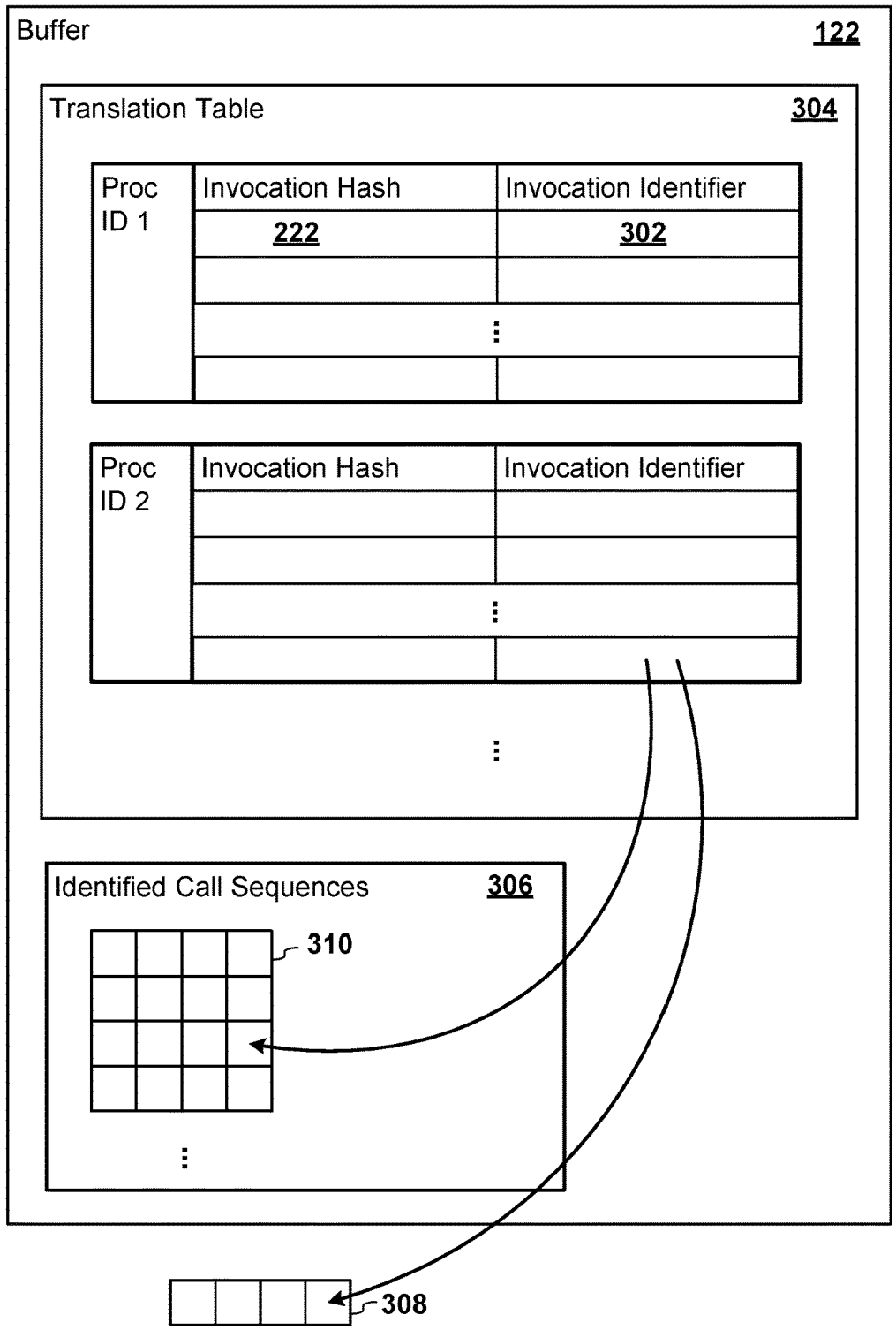
FIG. 3 illustrates an example buffer.

Because the invocation hash 222 may be relatively large in size, an innovative translation mechanism is provided. FIG. 3 illustrates an example of the buffer 122 embodying the translation mechanism. As indicated earlier above, the buffer 122 identifies sequences of invocations of operating system programmatic procedures that a corresponding one of the processes 106 made. In particular, the buffer 122 may include a translation table 304 (or other suitable translation data structure) and identified call sequences 306.

During operation of the recorder 116 of the difference detector 104, the recorder 116 may generate the buffer 122 for one or more of the corresponding processes 106.

The difference detector 104, and in particular for some examples, the recorder 116, may receive the message 202 indicating that a programmatic procedure of the operating system 102 was invoked. For example, the difference detector 104 or the recorder 116 may have registered with a tracing feature of the OS 102 in order to receive a copy of the message 202 (and copies of other messages corresponding to programmatic procedure invocations) in real time. Alternatively, the difference detector 104 or the recorder 116 may be part of the OS 102 and may be configured to receive a copy of the message 202 (and other messages corresponding to programmatic procedure invocations) in real time. In yet another example, the difference detector 104 or the recorder 116 may read the message 202 (and other messages indicating that programmatic procedures of the operating system 102 was invoked) from a trace file in real time or any arbitrary time after the programmatic procedure was invoked.

The recorder 116 may generate (220) the invocation hash 222 based on the message 202 as described above. As described above, generating (220) the invocation hash 222 based on the message 202 includes generating a hash of the entire message 202 or generating a hash of one or more components of the message 202.

The recorder 116 may translate the invocation hash 222 to an invocation identifier 302. Like the invocation hash 222, the invocation identifier 302 is an identifier that identifies the programmatic procedure invocation. However, the invocation identifier 302 is smaller in size than the invocation hash 222.

To perform the translation, the recorder 116 may use a translation table 304 or other translation data structure. The translation table 304 may include rows comprising invocation hashes and corresponding invocation identifiers. To translate the invocation hash 222 to the invocation identifier 302, the translation table 304 may be searched for a row that has an invocation hash matching the invocation hash 222 just generated. If there is such a row, then the invocation identifier 302 is read from the row of the translation table 304. Alternatively, if there is no matching entry, then the invocation hash 222 may be added to the invocation table 304 in addition to a newly assigned corresponding invocation identifier 302. The invocation identifier 302 may be any identifier that is unique to the rows in the invocation table 304 (or unique to the entries in any other translation data structure).

Alternatively or in addition, the invocation identifiers may be the row numbers in the translation table 304. In such examples, the invocations identifiers may not need to be stored in the rows of the translation table 304. In some examples, the rows may include programmatic procedure identifiers for faster lookup performance. In such examples, rows may be searched for programmatic procedure identifiers matching the programmatic procedure identifier 204 in the message 202, and the resultant matching rows may then be searched for the invocation hash 222. If the invocation hash 222 needs to be added to such a table, the programmatic procedure identifier 204 may be included in the row.

Any other suitable data structure may be used instead the translation table 304. For example, a translation data structure may include a first hash table having a key comprising programmatic procedure identifiers and corresponding values comprising a second hash table. The second hash table may have a key comprising invocation hashes for the corresponding programmatic procedure identifier and values comprising corresponding invocation identifiers.

The invocation of the programmatic procedure identified in the message 202 may be one invocation in a series of invocations of programmatic procedures made from the process 106 identified by the sender process identifier 206 of the message 202. With the invocation identifier 302 obtained, the invocation identifier 302 may now be included in a translated call sequence 308 that comprises invocation identifiers for a series of programmatic procedure invocations. For example, the translated call sequence 308 may include invocation identifiers identifying programmatic procedure invocations that occurred before the invocation of the programmatic procedure identified by the invocation hash 222 (and by the invocation identifier 302). The number of invocation identifiers in the translated call sequence 308 may equal to the window size L.

The recorder 116 may determine whether the translated call sequence 308 is included in previously identified call sequences 306. Each of the identified call sequences comprises invocation identifiers identifying the programmatic procedure invocations in the respective call sequence. The invocation identifiers in the identified call sequences 306 are each mapped to invocation hashes in the translation table 304 or other translation data structure. The identified call sequences 306 may be stored in any suitable data structure. For example, the identified call sequences 306 may be stored in a call sequence permutation table 310. The identified call sequences 306 may be a compact set of call sequences. If compact, the identified call sequences 306 may indicate, for the invocation identifier 302 of the current programmatic procedure invocation, a set of acceptable invocation identifiers for each corresponding previous position in the translated call sequence 308, where the set of acceptable invocation identifiers for any previous position is independent of the sets of acceptable invocation identifiers for the other previous positions in the translated call sequence 308. Accordingly, determining whether the translated call sequence 308 is included in the identified call sequences 306 may be more involved than looking for a row in a table that matches the content of the translated call sequence 308. For example, the sets of acceptable invocations may be sequentially checked for the previous positions in the translated call sequence 308.

If the translated call sequence 308 is not already included in the identified call sequences, then the recorder 116 may add the translated call sequence 308 to the identified call sequences 306.

The recorder 116 may repeat the procedure described above to develop the buffer 122 for one or more of the processes 106. When repeating, the invocation identifiers in the translated call sequence 308 may be shifted, removing the invocation identifier for the oldest invocation thereby making room for the invocation identifier of the next programmatic procedure invocation.

Figure 4:
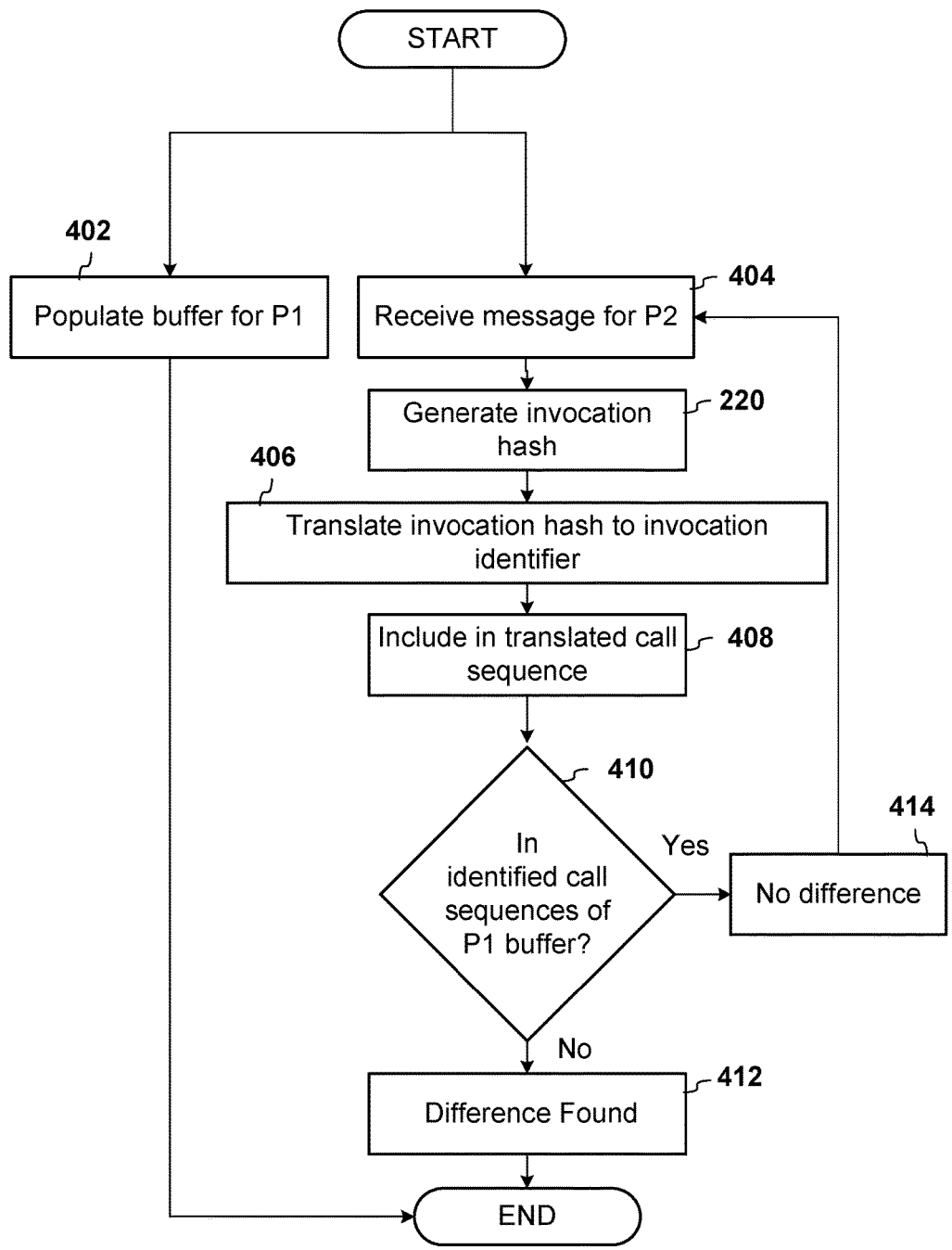
FIG. 4 illustrates a flow diagram of a first example logic of a non-coupled software lockstep system.

FIG. 4 illustrates a flow diagram of example logic of the non-coupled software lockstep system 100 configured to detect differences between outputs of processes 106. The logic may include additional, different, or fewer operations.

As the process P1 executes, the P1 buffer 122 for the process P1 may start being populated (402) by the recorder 116 as described above. The identified call sequences 306 in the P1 buffer 122 begins to grow. As the recorder 116 generates the P1 buffer 122, the monitor 118 may, in parallel, detect invocations of programmatic procedures of the OS 102 made by the process P2 and compare with those made by the process P1 that are identified in the P1 buffer 122.

For example, the message 202 may be received (404) by the monitor 118 indicating an invocation of a programmatic procedure of the OS 102 was made by the process P2. As described above, the message 202 may include, for example, the programmatic procedure identifier 204, the sender process identifier 206, and the receiver process identifier.

The invocation hash 222 may be generated (220) based on the message 202. For example, the monitor 118 may generate (220) the invocation hash 222 based on the programmatic procedure identifier 204, the sender process identifier 206, and the receiver process identifier 208, or based on any other combination of the components of the message 202. The sender process identifier 206 may be excluded from the invocation hash 222 in examples where P1 and P2 execute on the same node.

The invocation hash 222 may be translated (406) into the invocation identifier 302 as described above. For example, the monitor 118 may translate the invocation hash 222 to the invocation identifier 302 using the translation table 304. If the invocation hash 222 cannot be found in the translation table 304, then the invocation identifier 302 may be set to a placeholder value that indicates an unknown invocation. The placeholder may guarantee that the translated call sequence 308 is not found in the identified call sequences 306.

The invocation identifier 302 may be included (408) in the translated call sequence 308. The translated call sequence 308 here is for the process P2. As explained above, the translated call sequence 308 comprises invocation identifiers for a series of invocations of programmatic procedures, which in this case, were made by the process P2. If the length of the translated call sequence 308 is the window size L before including the invocation identifier 302, then the invocation identifier corresponding to the oldest invocation may be removed to make room for the invocation identifier 302 just obtained. Alternatively, if the length of the translated call sequence 308 is not yet the window size L, then operations may return to receive (404) the next message indicating the process 106 invoked another programmatic procedure.

A determination (410) may be made whether the translated call sequence 308 for P2 is included in the identified call sequences 306 of the P1 buffer 122. For example, the monitor 118 may search the identified call sequences 306 for the translated call sequence 308. As explained above, such a search may involve, for example, sequentially checking the sets of acceptable invocation identifiers for each position in the translated call sequence 308.

If the translated call sequence 308 for the process P2 is not included in the identified call sequences 306 of the P1 buffer 122, then the translated call sequence 308 may be identified (412) as a difference or deviation between the behaviors of the process P1 and the process P2. Otherwise, the translated call sequence 308 for the process P2 may be determined (414) to be the same as a corresponding call sequence for the process P1.

If the translated call sequence 308 is determined to be the same as a corresponding call sequence for P1, then operations may return to receive (404) the next message indicating the process P2 invoked another programmatic procedure. However, if the translated call sequence 308 is identified as a difference between the behaviors of P1 and P2, then operations may end by, for example, raising an alarm.

Alternatively or in addition, any type of action may be taken if the translated call sequence 308 is identified as a difference between the behaviors of P1 and P2. For example, operations may continue to try to detect differences by returning to receive (404) the next message indicating the process 106 invoked another programmatic procedure. The handler 120 may process any detected difference between the behaviors of the processes 106 by, for example, notifying a supervising application, raising an alarm to an end user, logging the difference, restarting the processes 106, and halting the processes 106.

Furthermore, the handler 120 may handle the sensitivity of difference detection. For example, if the translated call sequence 308 for the process P2 is identified (412) as a difference, then the handler 120 may increment a counter instead of immediately flagging the processes 106 as having different outputs. The handler 120 may wait to flag the processes 106 as having different outputs until after the counter passes a threshold value.

In the primary example described above, the recorder 116 generates just the P1 buffer and the P2 buffer is not generated. However, in other examples, the recorder 116 generates buffers for two or more of the processes 106, including, for example, the P1 buffer and the P2 buffer. The monitor 118 may then compare the identified call sequences 306 in the buffers with each other.

In some examples, the buffer or buffers 122 generated by the recorder 116 may be trimmed over time in order to keep the buffers 122 from growing too large. For example, entries in the buffers 112 may be removed if the entries have not been generated or used for longer than a threshold time or if the entries have not been generated or used since a threshold number of calls have subsequently been made by the corresponding process.

Figure 5:
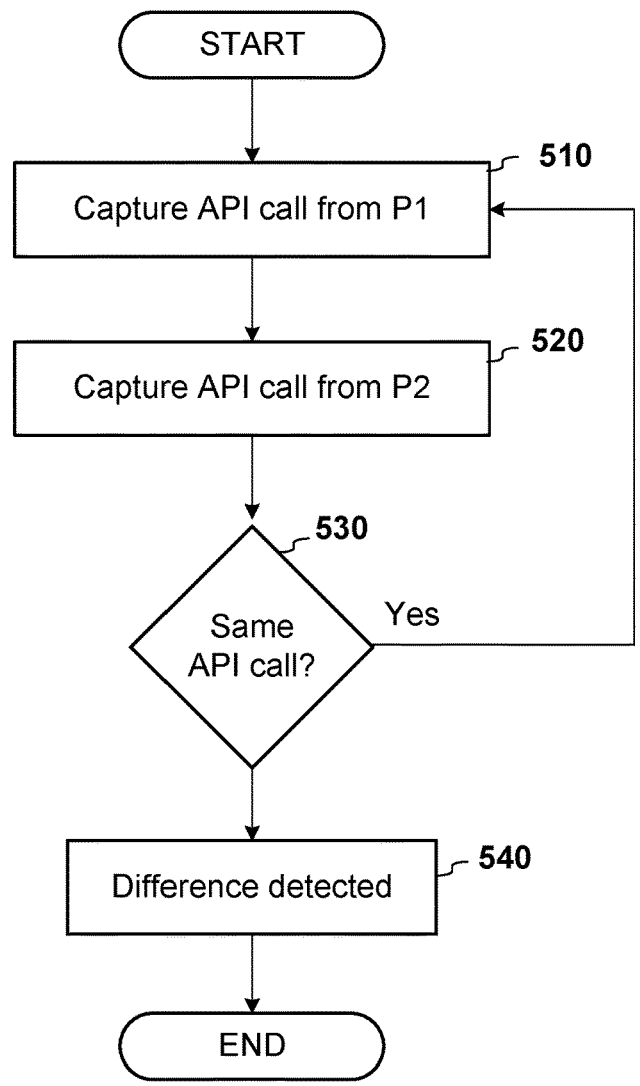
FIG. 5 illustrates a flow diagram of a second example logic of a non-coupled software lockstep system.

The non-coupled software lockstep system 100 may be implemented differently than described in FIGS. 3-4. FIG. 5 illustrates a flow diagram of a second example logic of the non-coupled software lockstep system 100.

An invocation of a programmatic procedure of the OS 102 made by the process P1 may be detected or captured (510). For example, the monitor 118 may receive the message 202 from the OS 102 that describes the invocation made by the process P1. The invocation of a programmatic procedure of the OS 102 may be referred to as an application programming interface call or API call.

An invocation of a programmatic procedure of the OS 102 (API call) made by the process P2 may be detected or captured (520). For example, the monitor 118 may receive the message 202 from the OS 102 that describes the API call made by the process P2.

The operating system programmatic procedure invocations made by the process P1 and the process P2 may be compared (530). For example, the monitor 118 may generate the invocation hash 222 of the header 216 and the parameters 214 of the message 202 for the API call made by the process P1. The monitor 118 may generate the invocation hash 222 of the header 216 and the parameters 214 of the message 202 for the API call made by the process P2. The API calls made by the process P1 and the process P2 may be compared (530) by comparing the invocation hashes. If the hashes are the same, then no difference is detected and operations may return to detect (510) the next API call made by the process P1. Alternatively, if the hashes are different, then a difference may be detected (540). The process may end, for example, by the handler 120 processing the detected difference. The sender process identifier 206 may be excluded from the invocation hash 222 in examples where P1 and P2 execute on the same node.

Some buffering may occur. For example, if the process P1 makes a second API call before the process P2 makes a first API call corresponding to the first API call that the process P1 made, then the recorder 116 may store the invocation hash 222 for the second API call made by the process P1 in the P1 buffer 122. Alternatively or in addition, if the process P2 makes a second API call before the process P1 makes the first API call, then the recorder 116 may store the invocation hash 222 for the second API call made by the process P2 in the P2 buffer.

Alternatively, in order to compare (530) the API calls, the monitor 118 may iterate over one or more of the components of the message 202 for the process P1 and compare with the corresponding components of the message 202 for process P2 without generating any invocation hashes.

Accordingly, the non-coupled software lockstep system 100 may detect a difference if the API calls listed in Table 4 below are made by process P1 and process P2, respectively. This is because the API call to read 60 characters made by the process P1 is different from the API call to read 70 characters made by the process P2. The invocation hash 222 for each will be different because the parameter values passed in the API calls are different from each other.

TABLE 4

| Process P1 API Calls | Process P2 API Calls |
| --- | --- |
| open | open |
| read 50 characters | read 50 characters |
| read 100 characters | read 100 characters |
| read 60 characters | read 70 characters |
| send a message with result X | send a message with result X |
| close | close |

The system 100 may be implemented with additional, different, or fewer components. For example, the system 100 may be implemented on a traditional type operating system like UNIX instead of a message-based operating system. Programmatic hooks may be registered for all or a subset of the application programming interface of the operating system. The hooks may provide the information that is available in the messages of a message-based operating system. In other words, the hooks may provide information identifying the invocation of the programmatic procedure. The information identifying the invocation of the programmatic procedure may include, for example, the programmatic procedure identifier 204, the one or more parameters 214 passed to the programmatic procedure, or any combination thereof. The hooks may be in a stub layer of the OS 102. The stub layer may include a stub for each corresponding operating system programmatic procedure. The stub is invoked by any application that invokes the corresponding operating system programmatic procedure. The stub may pass the parameters (if there are any) to an implementation of the corresponding operating system programmatic procedure. In addition, the stub may make a copy of information identifying the corresponding operating system programmatic procedure. The stub may provide the copied information to a central repository or to an application registered to receive the copied information.

Accordingly, the operating system programmatic procedure invocations may be detected by intercepting the operating system programmatic procedure invocations in the OS 102. In a message-based operating system, the invocations may be intercepted by obtaining a copy of the messages. Alternatively or in addition, the invocations may be intercepted by hooks in a stub layer.

Figure 6:
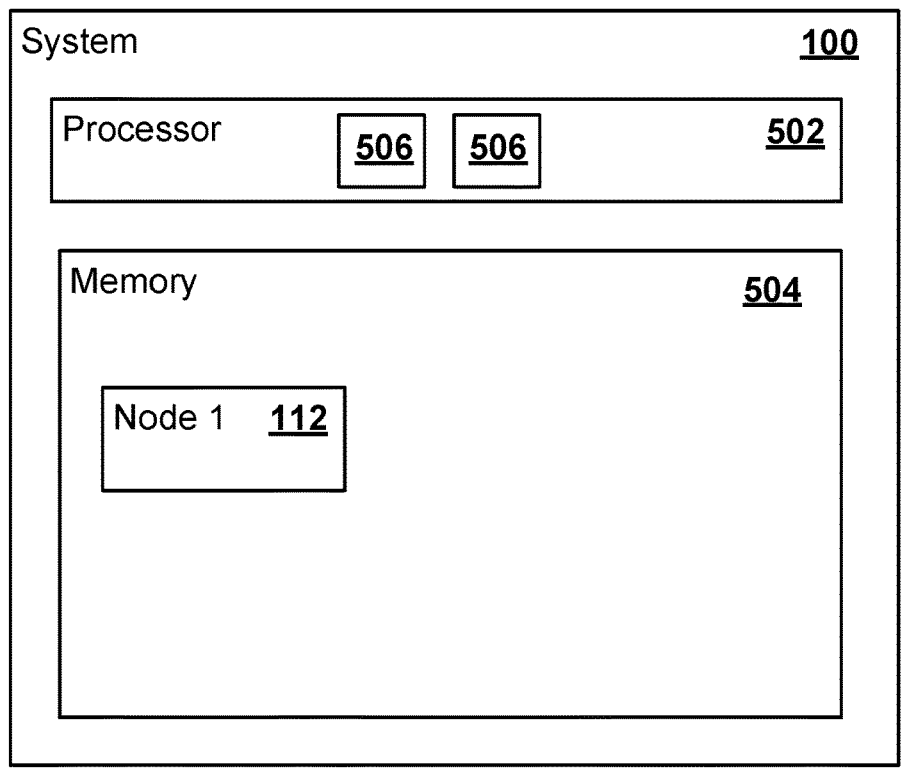
FIG. 6 illustrates an example of a non-coupled software lockstep system that includes a memory and a processor.

As another example, FIG. 6 illustrates an example of the system 100 that includes a memory 504 and a processor 502. The processor 502 may be in communication with the memory 504. In one example, the processor 502 may also be in communication with additional elements, such as a network interface (not shown). Examples of the processor 502 may include a general processor, a central processing unit, a microcontroller, a server, an application specific integrated circuit (ASIC), a digital signal processor, a field programmable gate array (FPGA), a digital circuit, and an analog circuit.

The processor 502 may be one or more devices operable to execute logic. The logic may include computer executable instructions or computer code embodied in the memory 504 or in other memory that when executed by the processor 502, cause the processor 502 to perform the features implemented by the logic of the difference detector 104, the system 100 or a combination thereof. The computer code may include instructions executable with the processor 502. The processor 502 may include multiple cores 506, multiple processors (not shown), multiple central processing units (CPUs) (not shown), or any combination thereof. A multi-core processor may be a single computing component comprising two or more independent processing units (each of the processing units referred to as a "core" or a "processor"). The "cores" or "processing units" are units or processors that may read and execute program instructions in parallel with each other.

The memory 504 may be any device for storing and retrieving data or any combination thereof. The memory 504 may include non-volatile memory, such as a read-only memory (ROM), an erasable programmable read-only memory (EPROM), and a flash memory, volatile memory, such as a random access memory (RAM), or a combination of non-volatile and volatile memory. Alternatively or in addition, the memory 504 may include an optical, magnetic (hard-drive) or any other form of data storage device.

The memory 504 may include the node 112, the second node 114, the difference detector 104, the recorder 116, the monitor 118, the handler 120, the OS 102, or any combination thereof.

Each component may include additional, different, or fewer components. For example, the difference detector 104 may include only the monitor 118. As another example, the message 202 may not include the indication 218 of the parameters 214.

The system 100 may be implemented in many different ways. Each module, such as the difference detector 104, the recorder 116, the monitor 118, and the handler 120, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 504, for example, that comprises instructions executable with the processor 502 or other processor to implement one or more of the features of the module. When any one of the module includes the portion of the memory that comprises instructions executable with the processor, the module may or may not include the processor. In some examples, each module may just be the portion of the memory 504 or other physical memory that comprises instructions executable with the processor 502 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules are but one set of example implementations of such functionality and any other configurations encompassing similar functionality are possible.

The respective logic, software or instructions for implementing the processes, methods, and techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method comprising:
  detecting a difference in behavior of processes that execute common code by detecting a difference in operating system programmatic procedure invocations made by the common code in the processes, wherein the difference in behavior indicates a hardware error occurred.

2. The method of aspect 1, wherein each respective one of the processes is executed on a corresponding core to which the respective process is tied.

3. The method of any of aspects 1 to 2, wherein detecting the difference in operating system programmatic procedure invocations comprises detecting a difference between a first hash of information that identifies an invocation of an operating system programmatic procedure by a first process and a second hash of information that identifies an invocation of an operating system programmatic procedure by a second process.

4. The method of any of aspects 1 to 3, wherein detecting the difference in operating system programmatic procedure invocations comprises detecting a difference between information that identifies an invocation of an operating system programmatic procedure by a first process and information that identifies an invocation of an operating system programmatic procedure by a second process.

5. The method of any of aspects 1 to 4, further comprising intercepting the operating system programmatic procedure invocations in a message layer of a message-based operating system.

6. The method of any of aspects 1 to 4, further comprising intercepting the operating system programmatic procedure invocations through a stub layer, the stub layer comprising a stub for each corresponding operating system programmatic procedure.

7. The method any of aspects 1 to 6, wherein detecting the difference in operating system programmatic procedure invocations comprises intercepting API calls made from the processes, wherein the common code executed by the processes is unaware that the API calls are intercepted.

8. A computer readable storage medium comprising computer executable instructions, the computer executable instructions executable by a processor, the computer executable instructions comprising:
  instructions executable to detect a first operating system programmatic procedure invocation invoked by a first process;
  instructions executable to detect a second operating system programmatic procedure invocation invoked by a second process; and
  instructions executable to detect a difference between the first operating system programmatic procedure invocation and the second operating system programmatic procedure invocation, the difference indicative of a hardware error.

9. The computer readable storage medium of aspect 8, wherein the first process is configured to execute on a first processing unit of the processor, and the second process is configured to execute on a second processing unit of the processor.

10. The computer readable storage medium of aspect 8, wherein the first process is configured to execute on a first node and the second process is configured to execute on a second node.

11. The computer readable storage medium of any of aspects 8 to 10, wherein the difference between the first operating system programmatic procedure invocation and the second operating system programmatic procedure invocation is a difference between a first value passed as a parameter in the first operating system programmatic procedure invocation and a second value passed as a parameter in the second operating system programmatic procedure invocation.

12. The computer readable storage medium of any of aspects 8 to 11, wherein the difference between the first operating system programmatic procedure invocation and the second operating system programmatic procedure invocation is a difference between a first indication of parameters of the first operating system programmatic procedure invocation and a second indication of parameters of the second operating system programmatic procedure invocation.

13. The computer readable storage medium of any of aspects 8 to 12, wherein the difference between the first operating system programmatic procedure invocation and the second operating system programmatic procedure invocation is a difference between a first procedure identifier of the first operating system programmatic procedure invocation and a second procedure identifier of the second operating system programmatic procedure invocation.

14. The computer readable storage medium of any of aspects 8 to 14, further comprising instructions executable to intercept the first operating system programmatic procedure invocation invoked by the first process and the second operating system programmatic procedure invocation invoked by the second process in an operating system.

15. A system comprising:
a processor configured to:
detect a first operating system programmatic procedure invocation invoked by a first process;
detect a second operating system programmatic procedure invocation invoked by a second process; and
detect a hardware error based on a difference between the first operating system programmatic procedure invocation and the second operating system programmatic procedure invocation.

16. The system of aspect 15, wherein the first process is configured to execute on a first processing unit of the processor, and the second process is configured to execute on a second processing unit of the processor.

17. The system of any of aspects 15 to 16, wherein the difference between the first operating system programmatic procedure invocation and the second operating system programmatic procedure invocation is a difference between a first value passed as a parameter in the first operating system programmatic procedure invocation and a second value passed as a parameter in the second operating system programmatic procedure invocation.

18. The system of any of aspects 15 to 17, wherein the difference between the first operating system programmatic procedure invocation and the second operating system programmatic procedure invocation is a difference between a first indication of parameters of the first operating system programmatic procedure invocation and a second indication of parameters of the second operating system programmatic procedure invocation.

19. The system of any of aspects 15 to 18, wherein the difference between the first operating system programmatic procedure invocation and the second operating system programmatic procedure invocation is a difference between a first procedure identifier of the first operating system programmatic procedure invocation and a second procedure identifier of the second operating system programmatic procedure invocation.

20. The system of any of aspects 15 to 19, wherein the processor is further configured to intercept the first operating system programmatic procedure invocation and the second operating system programmatic procedure invocation in an operating system.

What is claimed is:

1. A system comprising:
a memory; and
a processor configured to:
detect a first series of operating system programmatic procedure invocations invoked by a first process;
store in the memory a first ordered set of identifiers identifying the operating system programmatic procedure invocations in the first series;
detect a second series of operating system programmatic procedure invocations invoked by a second process;
generate a second ordered set of identifiers identifying the operating system programmatic procedure invocations in the second series; and
detect a hardware error based on a difference between the first ordered set of identifiers and the second ordered set of identifiers.

2. The system of claim 1, wherein the first process is configured to execute on a first processing unit of the processor, and the second process is configured to execute on a second processing unit of the processor.

3. The system of claim 1, wherein the processor is further configured to intercept the first operating system programmatic procedure invocations and the second operating system programmatic procedure invocations in an operating system.

4. The system of claim 1, wherein the processor is configured to generate the first ordered set of identifiers by, for each operating system programmatic procedure invocation, generating an invocation hash of a portion of a message invoking that operating system programmatic procedure invocation.

5. The system of claim 4, wherein the processor is further configured to generate the first ordered set of identifiers by, for each invocation hash, translating that invocation hash to an invocation identifier.

6. The system of claim 4, wherein generating the invocation hash includes hashing the portion of the message that includes one or more of a programmatic procedure identifier, a sender process identifier, or a receiver process identifier.

7. The system of claim 4, wherein the processor is configured to detect the first series and detect the second series by detecting a respective number of invocations from each of the first process and the second process based on a window size.

8. A computer readable storage medium comprising computer executable instructions, the computer executable instructions executable by a processor, the computer executable instructions comprising:
instructions executable to detect a first series of operating system programmatic procedure invocations invoked by a first process;
instructions executable to store in memory a first ordered set of identifiers identifying the operating system programmatic procedure invocations in the first series;
instructions executable to detect a second series of operating system programmatic procedure invocations invoked by a second process;
instructions executable to generate a second ordered set of identifiers identifying the operating system programmatic procedure invocations in the second series; and
instructions executable to detect a hardware error based on a difference between the first ordered set of identifiers and the second ordered set of identifiers.

9. The computer readable storage medium of claim 8, wherein the first process is configured to execute on a first processing unit of the processor, and the second process is configured to execute on a second processing unit of the processor.

10. The computer readable storage medium of claim 8, wherein the first process is configured to execute on a first node and the second process is configured to execute on a second node.

11. The computer readable storage medium of claim 8, further comprising instructions executable to intercept the first operating system programmatic procedure invocations invoked by the first process and the second operating system programmatic procedure invocations invoked by the second process in an operating system.

12. The computer readable storage medium of claim 8, wherein the instructions include instructions to generate the first ordered set of identifiers by, for each operating system programmatic procedure invocation, generating an invocation hash of a portion of a message invoking that operating system programmatic procedure invocation.

13. The computer readable storage medium of claim 12, wherein the instructions to generate the first ordered set of identifiers further include instructions to, for each invocation hash, translate that invocation hash to an invocation identifier.

14. The computer readable storage medium of claim 12, wherein generating the invocation hash includes hashing the portion of the message that includes one or more of a programmatic procedure identifier, a sender process identifier, or a receiver process identifier.

15. The computer readable storage medium of claim 12, wherein the instructions further include instructions to detect the first series and detect the second series by detecting a respective number of invocations from each of the first process and the second process based on a window size.

16. A method comprising:
   detecting a first series of operating system programmatic procedure invocations invoked by a first process;
   storing in memory a first ordered set of identifiers identifying the operating system programmatic procedure invocations in the first series;
   detecting a second series of operating system programmatic procedure invocations invoked by a second process;
   generating a second ordered set of identifiers identifying the operating system programmatic procedure invocations in the second series; and
   detecting a hardware error based on a difference between the first ordered set of identifiers and the second ordered set of identifiers.

17. The method of claim 16, wherein each respective one of the processes is executed on a corresponding core to which the respective process is tied.

18. The method of claim 16 wherein detecting the hardware error comprises detecting a difference between a first hash of information that identifies an invocation of an operating system programmatic procedure by the first process and a second hash of information that identifies an invocation of an operating system programmatic procedure by the second process.

19. The method of claim 16 further comprising intercepting the operating system programmatic procedure invocations in a message layer of a message-based operating system.

20. The method of claim 16 further comprising intercepting the operating system programmatic procedure invocations through a stub layer, the stub layer comprising a stub for each corresponding operating system programmatic procedure.

21. The method of claim 16 wherein detecting the first series of operating system programmatic procedure invocations and detecting the second series of operating system programmatic procedure invocations include intercepting API calls made from the processes, wherein common code executed by the processes is unaware that the API calls are intercepted.

* * * * *